March 7, 1950 — R. W. JENNY — 2,499,826
CONSTANT SPEED PROPELLER
Filed Nov. 14, 1945
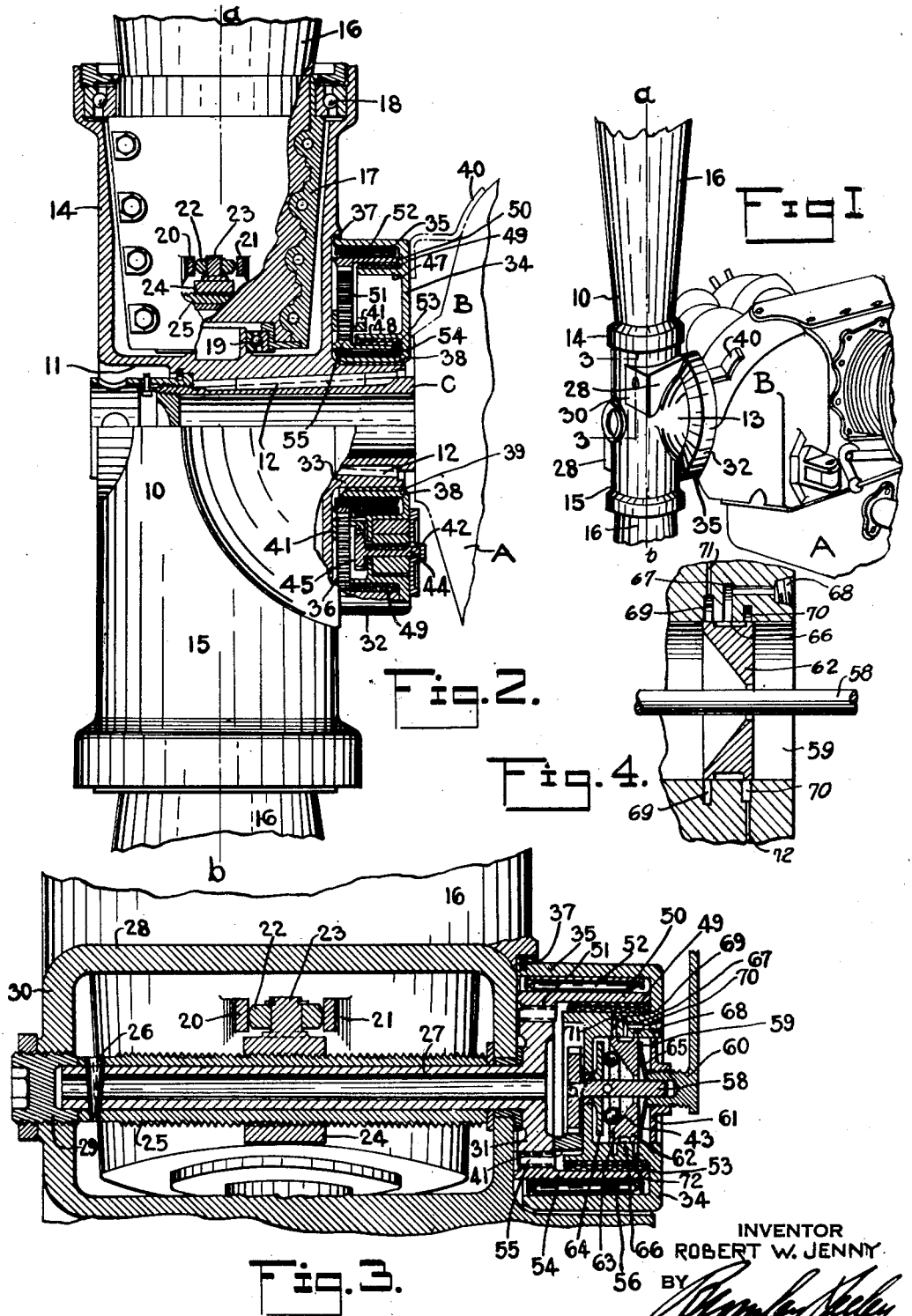
INVENTOR
ROBERT W. JENNY
BY
ATTORNEY Patented Mar. 7, 1950

2,499,826

UNITED STATES PATENT OFFICE 2,499,826

CONSTANT SPEED PROPELLER

Robert W. Jenny, East Paterson, N. J., assignor to Curtiss-Wright Corporation, Bloomfield, N. J., a corporation of Delaware Application November 14, 1945, Serial No. 628,393

4 Claims. (Cl. 170—160.18)

The invention relates in general to an improvement in constant speed aircraft propellers, and specifically relates to an improved form of propeller assembly of the type in which the pitch of its associated blades is set at some preselected angle best suited for efficient operation at normal engine speed.

The primary object of the invention is to maintain a constant propeller speed despite the momentary presence of forces, such as variations in engine speed or vehicle speed as in diving, and which force factors of course tend to vary the continuity of the desired prefixed propeller speed.

Broadly this objective is obtained by utilizing variations in the pitch of the propeller blades imposed thereon by variations in propeller speeds either by variations in engine speed or by windmilling, as a control for automatically increasing the pitch angle so as to slow down the propeller speed when overspeeding, and for decreasing the pitch angle to increase propeller speed when underspeeding.

Still another object of the invention is to provide a simple form of propeller assembly which will contain within itself all the mechanism necessary to effect the requisite corrective change in pitch to impose or release an increment of load on the propeller blades as may be necessary to maintain the propeller speed at the desired constant, and in this connection to provide a composite unit complete in itself and designed to be mounted conventionally on any engine shaft.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the accompanying drawings:

Fig. 1 is a view largely in perspective showing a preferred embodiment of the invention mounted on an airplane engine;

Fig. 2 is an enlarged view partly in side elevation looking at the right side of Fig. 1 and partly in vertical section taken axially of the engine shaft;

Fig. 3 is a vertical section view taken on a plane offset from the sectional part of Fig. 2 and taken on the line 3—3 of Fig. 1; and Fig. 4 is an enlarged sectional detail of a portion of Fig. 3 showing valve port arrangement.

In the drawings there is disclosed a part of an airplane engine A including its nose section B and which engine is provided with an engine shaft C of conventional design. It is herein intended in general that the engine be of any known type and not necessarily an airplane engine. Mounted on the engine shaft is a propeller assembly 10 which constitutes the novel feature of the disclosure and in effect forms an attachment to the engine. The assembly includes a long hub 11 demountably secured to the engine shaft by splines 12 and nut not shown and otherwise arranged to turn therewith following conventional practices in this respect. The propeller assembly includes a central body portion 13 from which projects a pair of outstanding tubular receptacles 14 and 15 extending diametrically of each other as shown in Fig. 1. As each receptacle and its associated parts are identical in structure and function, the detailed description of one will fit the other. Mounted in each receptacle is a propeller blade 16, the intruded end of each of which is contained in a metal socket 17 and conventionally mounted in each case respectively in outer bearings 18 and inner bearings 19 to permit turning of each blade about its long axis $a$—$b$, and thus obtain variations in the pitch angle of each of the blades. For the purpose of turning the blade the metal socket is provided with a pair of outstanding circumferentially spaced apart projections 20 and 21 between which operates a roller 22 rotating on a stud 23 projecting laterally from a nut 24 mounted on a threaded shaft 25 as more particularly shown in Fig. 3. The arrangement is such that when the nut moves from its central position as shown in Fig. 3 towards the left by reason of the rotation of shaft 25 in one direction, the pitch of the associated blade is increased, while a movement of the nut to the right of its normal centered position by reason of the rotation of the shaft in a contra-direction will cause the angle of the blade to decrease from its normal pre-set angle. The threaded shaft 25 telescopes and is secured by pin 26 to a main shaft 27 mounted for rotary movement in a hollow casing 28 forming an integral extension projecting from the body portion 13 as best shown in Fig. 1. The two casings 28 are shown in Fig. 1 in balanced relation on opposite sides of the body portion, and diagonally related each adjacent its associated propeller blade. The forward end of shaft 27 is mounted in an adjustable bearing 29 carried in the front wall 30 of the casing 28. The right end of the main shaft 27 projects exteriorly of the casing through its rear wall towards the engine and terminates in a spur gear pinion 31 disposed to be rotated both clockwise and anti-clockwise as hereinafter indicated to shift the nut right and left on its threaded shaft 25 as above indicated.

Located between the propeller assembly as thus far described and the nose section B of the engine casing is a hollow housing 32 of annular form fitted to and carried by an inward extension 33 of the hub 11 and coacting with the propeller assembly to form a complete unit readily mounted on and removable from the engine shaft.

The housing 32 includes a rear flat closure wall 34 and a rugged outer cylindrical rim 35 fitted into a recess 36 provided therefore in the rear face of the body portion 13. An oil ring 37 is fitted between rim 35 and the wall outlining the recess to avoid oil leakage out of the assembly. A long bearing wall 38 integral with the rear wall 34 forms the inner perimeter of the housing 32 and a long plain bearing 39 is interposed between the same and the hub extension 33. The housing is secured from rotation and held fixed in space by means of one or more mounting brackets 40 securing it to the engine casing of the engine nose section.

Secured to the body portion 13, encircling the extension 33 of the hub 11 and projecting into the housing 32 is a large driving gear 41 for operating an air pump 42 and for operating a centrifugal governor 43 hereinafter described.

The air pump as shown in Fig. 2 is of conventional design and includes an actuating shaft 44 provided with a pinion 45 at all times meshing with the gear 41. So long as the propeller assembly is turning the pump 42 provides a constantly available source of air pressure for actuating a pair of expandable brakes by the selective action of a speed control valve hereinafter described and in turn controlled by the ball governor 43.

The wall 34 of the housing 32 is also provided with a pair of inwardly projecting wide flanges forming a pair of concentric brake drums, that is an outer drum 47 and an inner drum 48. An outer expandable brake 49 is located between the outer drum 47 and a drum-like flange 50 projecting from a large internal gear 51 fitted axially between the wall 34 and the bottom of the recess 36. A roller bearing 52 rides on the flange 50 between the same and the outer rim 35. Gear 51 is at all times in mesh with spur gear pinion 31 as best shown in Fig. 3. The parts are so organized that when the brake 49 is expanded by means of the admission thereto of compressed air from the pump 42, the gear 51 is clutched to the housing 32, is thus restrained from rotating while permitting pinion 31 to revolve about the fixed track provided by the gear 51 when so locked to the engine casing.

Similarly there is disposed between the inner drum 48 and the flange forming the bearing wall 38 of the housing, an inner expandable brake 53, the flange 54 of a relatively small external gear 55 and roller bearing 56, all fitting axially between the wall 34 and the body portion 13. Gear 55 is at all times in mesh with the spur gear pinion 31 as shown in Fig. 3 and functions as above described for gear 51. These parts are so organized that with the expansion of the brake 53 the gear 55 is fixed to the housing and held thereby from rotation. From this construction it is seen that either gear 51 or 55 may be held from rotation selectively while the rotation of the propeller operating through pinion 31, main shaft 27 and threaded shaft 25 will cause the nut 24 to move right or left on the threaded shaft depending upon which of the expandable brakes is in selective clutching position at the moment.

The selective actuation of either brake 49 or 53 is dependent on the speed of rotation of the propeller assembly acting through the driving gear 41. The gear 41 meshes with pinion 57 on governor shaft 58 which extends as shown in Fig. 3 through a valve chamber 59 formed in the housing and has its end journalled in an adjustable nut 60 threaded into a closure plate 61 at the open end of the chamber. A valve 62 is slidably mounted in the chamber and at its outer side provides a conical surface 63 engaged by a plurality of balls forming the centrifugal governor 43. A stop plate 64 pinned to the shaft coacts with the bevel surface 63 to form a wedge space to accommodate the balls 43. A spring 65 reacts between the nut 60 and the valve and is biased to shift the valve to the left of the showing in Fig. 3 when the governor is free from centrifugal force and the balls collapsed towards the shaft 58. The valve 62 is provided at its perimeter with an annular channel 66 and in the position shown in Fig. 3 the valve is in a middle position shutting off fluid communication between the air pump 42 and both of the expandable brakes and is the position assumed by the valve when the engine shaft is turning at the desired normal driving speed.

The wall outlining the valve chamber 59 is provided with three ports 67, 69 and 70, the ports 67, 69 and 67, 70 being communicable at times by registry therewith of the groove 66 in the governor actuated valve 62. The air pump 42 (Fig. 2) delivers its output through a conduit, not shown, to the air supply port 68 and thence to the middle valve port 67. The left port 69 is in open fluid communication with the outer brake 49 through a passageway 71 and the right port 70 is similarly in communication with the inner brake 53 through a passageway 72 in the wall which outlines the chamber 59.

In operation and assuming that the engine is turning its shaft at its desired or normal speed, then the ball governor by reason of the presetting of tension on the spring 65 by the manipulation of the nut 60 will be in the intermediate position and the valve in its mid-position shown in Fig. 3, and in this position there will be no air pressure acting on either of the expansible brakes. In the event the engine shaft overspeeds for any reason the ball governors will of course move outwardly by centrifugal action from their preset position shown in Fig. 3 thus shifting the valve to the right of the position shown. This places the air pump in fluid communication with the right port 70 to introduce air pressure into the outer drum to clutch the gear 51 in fixed relation to the engine casing. With gear 51 so held from rotation in space the continued rotation of the propeller assembly acts to drive pinion 31 and shafts 27—25 in the direction to cause nut 24 to increase the pitched angle of both of the blades 16. This increase of pitch angle increases the normal load on the blades with a resulting tendency to reduce their speed and with a reduction in speed the ball governors 43 collapse inwardly permitting spring 65 to restore the valve to its normal centered position.

On the other hand, assuming that the speed of the engine is for the moment below the preset engine speed, then the ball governors will tend to further collapse from their normal intermediate position shown in Fig. 3 inwardly towards the shaft 58 thus permitting spring 65 to move the valve further to the left from the position shown in Fig. 3 thus placing the left port 69 in communication with the air pump. This resetting of the valve opens pressure to the inner brake 53 and forces the same into clutching engagement with the gear 55 to cause it to be fixed in space and thus permit the pinion 31 to ride about the gear 55 as above indicated. This rotates the threaded shaft 25 in the opposite rotary direction, that is in a direction to reduce the pitch of the blades 16. With this reduction in pitch of blades there is attained a corresponding reduction in the load imposed on the blades thus permitting the blades to speed up until the engine shaft is rotating at the speed at which these several controls have been set and under which condition both brakes are inoperative and the parts restored to their normal operative position as shown in the several figures of the drawing.

By varying the tension imposed on the spring 65 by suitably advancing or retarding nut 60, the governor may be adjusted as desired and in this way the speed of the engine shaft may be eventually set at that speed at which the engine functions most efficiently.

It is a particular feature of this disclosure that all of the controls for maintaining the engine shaft at its constant speed is contained in and forms a readily demountable part of the propeller assembly. It is thus possible to replace the propeller and the controls therefor without disturbing any other part of the engine construction.

I claim:

1. A propeller assembly for mounting on a power shaft including a body portion rotatable with the shaft, a propeller blade rotatably mounted in the body portion for adjusting its pitch angle, means for adjusting the pitch angle of the blade, said means including a pinion and a shaft operatively connected to the pinion and blade, a pair of gears each in mesh with the pinion and normally running idle, a pair of pneumatically expandable brakes, one for each gear and engageable therewith, a source of compressed air for expanding the brakes to engage said gears, a valve for selectively causing either brake to become operative, a governor actuated by the speed of the rotating assembly and operatively connected to the valve to cause the same to open one of the brakes to said source while intercepting communication between the source and the other brake, and a non-rotatable casing journalled on said propeller body portion, housing said gears, brakes, air source, valve and governor, said casing providing reaction means for said brakes when the latter are energized.

2. A propeller assembly for mounting on a power shaft including a hub rotatable with the shaft and having blade sockets, blades mounted in said sockets for pitch changing, a mechanism on the hub for changing blade pitch including a member movable relative to the hub, a casing journalled on the hub and fixed against rotation, a governor, having a valve operable in response to speed errors, in said casing driven by rotation of said hub relative to the casing, means wholly within said casing and controlled by governor valve movement to actuate said movable member for changing blade pitch, said latter means comprising a pair of non-rotating brake elements, fluid means controlled by the governor valve for pressurizing one or the other of said brake elements with fluid, and normally freely rotatable drums within said casing and operatively connected to said movable member, said drums being engageable by said brake elements when pressurized, to restrict rotation of said drums.

3. A propeller assembly for mounting on a power shaft including a hub rotatable with the shaft, having blades mounted therein for pitch change, a casing journalled on the hub and secured against rotation therewith, gearing, including a pair of normally free turning brake drums rotatable with the propeller, connected to said blades for effecting changes in the pitch of the blades in response to reduction in the speed of one or the other of said brake drums below propeller speed, brake elements anchored in said casing inflatable selectively to engage and slow one or the other of said brake drums, a governor having a valve operated thereby and connected to said brake elements, and a fluid pressure source for inflating said brake elements through and by operation of said valve.

4. A propeller assembly for mounting on a power shaft including a hub rotatable with the shaft having blades mounted therein for pitch change, a casing journalled on the hub and secured against rotation therewith, gearing, including a pair of normally free turning brake drums rotatable with the propeller, connected to said blades for effecting changes in the pitch of the blades in response to reduction in the speed of one or the other of said brake drums below propeller speed, brake elements anchored in said casing inflatable selectively to engage and slow one or the other of said brake drums, a governor having a valve operated thereby and connected to said brake elements, and a fluid pressure source for inflating said brake elements through and by operation of said valve, said governor and fluid pressure source being driven by said propeller and being contained within said casing.

ROBERT W. JENNY.

REFERENCES CITED

The following references are of record in the file of this patent:

UNITED STATES PATENTS

| Number | Name | Date |
| --- | --- | --- |
| 2,007,417 | Aivaz | July 9, 1935 |
| 2,138,339 | Chauviere | Nov. 29, 1938 |
| 2,184,143 | Hoover | Dec. 19, 1939 |
| 2,229,058 | Dicks | Jan. 21, 1941 |
| 2,250,694 | Algarsson | July 29, 1941 |

FOREIGN PATENTS

| Number | Country | Date |
| --- | --- | --- |
| 517,870 | Great Britain | Feb. 12, 1940 |